United States Patent [19]

Rosenblum

[11] 3,875,065

[45] Apr. 1, 1975

[54] VIBRATORY SEPARATOR SCREEN

[76] Inventor: Jesse Rosenblum, 112 Roosevelt St., Closter, N.J. 07624

[22] Filed: Sept. 17, 1973

[21] Appl. No.: 397,870

Related U.S. Application Data

[63] Continuation-in-part of Ser. No. 241,142, April 5, 1972, Pat. No. 3,792,774.

[52] U.S. Cl. ................. 210/388, 55/511, 209/403, 210/495, 210/499
[51] Int. Cl. ............................................. B07b 1/28
[58] Field of Search ......... 204/403; 55/DIG. 5, 511; 210/495, 446, 445, 453, 499, 488, 388; 264/292

[56] References Cited
UNITED STATES PATENTS

| | | | |
|---|---|---|---|
| 1,663,164 | 3/1928 | Helman | 209/403 |
| 2,182,585 | 12/1939 | Green | 210/445 X |
| 2,210,509 | 8/1940 | Strauch | 264/292 X |
| 2,217,920 | 10/1940 | Roubal | 209/403 |
| 3,341,013 | 9/1967 | Moulton | 210/495 X |
| 3,651,947 | 3/1972 | Schollhamer | 210/499 X |
| 3,684,091 | 8/1972 | Wehner | 209/403 |

*Primary Examiner*—Frank A. Spear, Jr.
*Attorney, Agent, or Firm*—Hubbell, Cohen & Stiefel

[57] ABSTRACT

A vibratory separator screen which is assembled in accordance with a multi-stage tensioning method. The screen is initially mounted to an annular member, such as a ring of right angle cross-section at a level of tension which is less than a desired level. This ring is then force fit over an annular frame to increase, the level of tension on the screen to a predetermined level, this arrangement maintaining the screen at this predetermined level.

4 Claims, 3 Drawing Figures

VIBRATORY SEPARATOR SCREEN

CROSS-REVERENCE TO RELATED APPLICATIONS

This application is a continuation-in-part of my co-pending U.S. patent application, Ser. No. 241,142, filed Apr. 5, 1972, and entitled Vibratory Separator Screens and a Method and Apparatus for Making Same, Now U.S. Pat. No. 3,792,774

BACKGROUND OF THE INVENTION

1. Field of the Invention

This invention relates to vibratory separator screens.

2. Description of the Prior Art

A common form of vibratory separator is disclosed in U.S. Pat. No. 3,463.315 issued on Aug. 26, 1969 to Reisbeck. The separator shown in that patent comprises upper and lower cylindrical members forming chambers therein. The upper member is mounted on springs to the lower member and may be vibrated relative to the lower member by means of an electric motor assembly positioned in the lower chamber. A vibratory screen is mounted in the upper chamber and is vibrated along with the upper chamber. A substance to be processed is fed onto the screen from above as the latter is vibrated. In this manner, desirable or undersirable particles in the substance may be filtered by size and consistency, dependent upon the nature and characteristics of the screen and of the substance.

Common vibratory screens are circular having a diameter usually ranging from 18 inches to 60 inches. In larger units, however, separator screens may have a diameter as large as 100 inches or more. The screen material is preferably a wire mesh cloth which may be synthetic or metallic and which usually has a mesh rating within the range of 1 mesh to 400 mesh, depending upon the nature of the substance to be processed.

It is important in separators to use vibratory screens which are strong and durable and able to withstand the persistent vibrations experienced when processing a substance. Further, it is important for the screen to be maintained in a taut and strongly tensioned manner since separators are usually used to filter a wide variety of substances having a wide variety of weights, consistencies and, if liquids, viscosities. Examples of such substances are sewage, food, sand and gravel, pulp and paper, drugs, ceramics, sugar, paint, clay and petroleum, to name a few.

Various separator screens, as well as their methods of manufacture and assembly are known in the art. In a method of assembling one type of separator screen, for example, a wire cloth blank of desired mesh is clamped on four sides and is then stretched by tightening bolts on a heavy frame. A pair of complementary rings are then mounted to each other on opposite sides of the cloth, such as by spot welding or the like. The periphery of the rings is then appropriately dressed to remove excess cloth.

The above method is complex in nature requiring a significant amount of man-hours to assemble each separator screen with the required degree of tautness. More specifically, the tightening bolts must be individually turned thereby tightening the cloth in increments at different location. Further, the resultant screen oftentimes lacks uniformity of tension thereby hastening its wear. Such non-uniformity is increased by slippage which is at a minimum in the vicinity of the spot welds and is at a maximum at points intermediate each pair of adjacent spot welds.

Other separator screens and their method of manufacture are disclosed in the following U.S. Pat. No. 3,286,338 issued on Nov. 22, 1966 to Bohr; 3,291,164 issued on Dec. 13, 1966 to Swallow; and 3,341,013 issued on Sept. 12, 1967 to Moulton. In the Swallow patent, for example, a multi-stage tensioning method is used wherein a wire cloth is tensioned in stages to a desired level of tension. However, the cloth of Swallow is finally tensioned by applying a force directly to the cloth itself which tends to rupture the mesh.

Procedures for manufacturing framed screens other than vibratory separator screens are also known. For example, reference is had to U.S. Pat. No. 2,753,897 issued July 10, 1956 to Conrad. The screen of Conrad is manufactured by assembling a rectangular shaped frame having four discontinuous caulking grooves. Four corresponding splines are placed on a worktable with the wire mesh cloth blank being first cut to proper size, placed on a planar sheet and then draped over the splines. The frame is then moved downwardly onto the cloth with the splines forcing the periphery of the cloth into the grooves of the frame.

The screen of Conrad is used primarily as a window screen which does not require the high degree of tautness that is requisite in vibratory separator screens. Thus, conrad only uses a single stage tensioning method wherein the tension of the cloth is far less than that required in vibratory screens. Further, Conrad's screens could not be used as vibratory screens even if properly highly tensioned since the corners of the frame would rip through the wire cloth thereby damaging the screen and significantly reducing the tension.

SUMMARY OF THE INVENTION

A vibratory separator screen includes an annular frame having a peripheral side wall, a mounting ring having an aperture therein, the ring having a substantially right-angled cross section defined by intersecting horizontal and vertical segments, and a cloth of desired mesh secured to the mounting ring and spanning the aperture therein. The cloth is fixedly bonded, such as by epoxy cement to the mounting ring at a first tension level less than a predetermined level of tension. The inner diameter of the vertical segment of the mounting ring is normally less than the outer diameter of the frame side wall and the mounting ring is force fit at its vertical segment over the frame to provide the predetermined level of tension for the cloth and to maintain this predetermined tension level, such as by sandwiching the secured cloth between the mounting ring vertical segment and an outwardly extending flange of the frame or gy cooperation between the bonded cloth and the force fit mounting ring without such sandwiching.

These and other aspects and advantages of the present invention shall be more clearly described with reference to the accompanying drawing.

DETAILED DESCRIPTION OF THE PREFERRED EMBODIMENT

Figure 1:
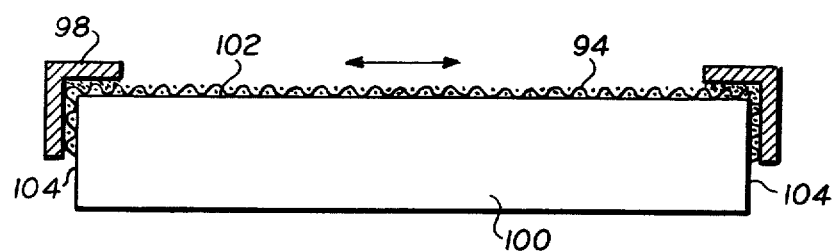
FIG. 1 is a cross-sectional view of annular pretensioning assembly for cloth screens taken along a diametric path through the assembly.
Figure 2:
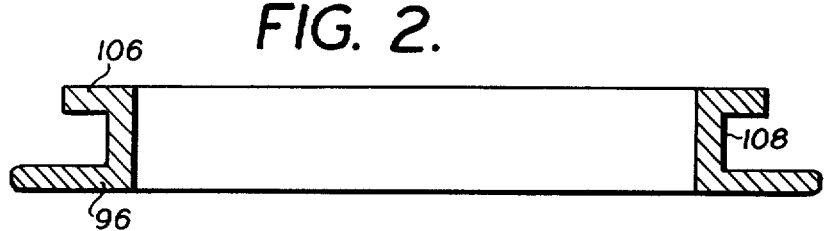
FIG. 2 is a cross-section view of an annular frame onto which the pretensioned cloth of FIG. 1 is to be mounted.
Figure 3:
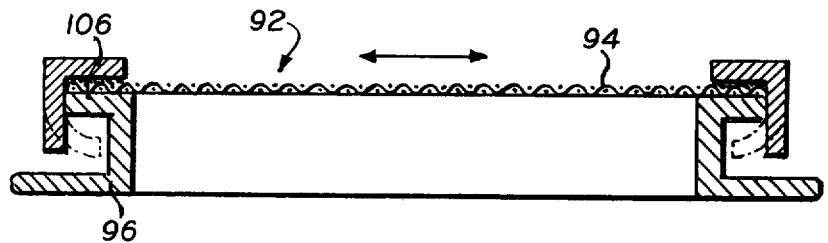
FIG. 3 is a cross-sectional veiw of the preferred embodiment of a separator screen of this invention.

Referring to the drawings in detail, FIGS. 1–3 illustrate the preferred vibratory separator screen 92 of the present invention (FIG.3) and its preferred method of manufacture. Referring initially to FIG. 3, separator screen 92 preferably comprises a foraminous wire cloth 94 of desired mesh which is mounted at a desired predetermined level of tension to an annular frame 96.

As best shown in FIG. 1, cloth 94 is preferably first bonded to an annular ring 98 which is preferably of right-angled cross section.

To pretension and bond cloth 94 to ring 98, cloth 94 is preferably draped over a worktable 100 having a substantially planar upper surface 102 which is preferably coated with a "non-stick" substance such as polytetrafloroethylene ("Teflon"). Worktable 100 also includes a peripheral side wall 104 which is perpendicular to upper surface 102 and is preferably similarly coated. The diameter of worktable 100 is slightly less than the inner diameter of the vertical segment of ring 98. Then, a bonding material, such as epoxy cement, is spread over the inner surface of the horizontal segment of ring 98, which ring is then pushed down onto and around worktable 100. The epoxy cement will not adhere to the non-stick substance. As ring 98 is moved downwardly, it will be noted that the periphery of cloth 94 (sandwiched between side wall 104 and ring 98) will be correspondingly forced downwardly along the side wall thereby stretching and tensioning the cloth to a first level of tension less than a desired predetermined level. When the epoxy has hardened to effect a bond between cloth 94 and ring 98, the ring and cloth assembly is removed from worktable 100. Then, the excess cloth not bonded to the ring is removed (e.g. that portion overlying the vertical segment of the ring.)

Referring now to FIGS. 2 and 3 annular frame 96 of vibratory screen 94 preferably includes an annular lip 106 which extends radially outward from the upper end of a peripheral side wall 108 of the frame, the upper surface of lip 106 being essentially coplanar with the upper surface of the remainder of frame 96. It is further preferred that the downward extent of lip 106 be approximately about one-third the downward extent of the vertical segment of ring 98. It is necessary, in accordance with this invention, that the outer diameter of lip 106 be no less than, and preferably greater than, the inner diameter of the vertical segment of ring 98 so that ring 98 may be pressed over frame 96 only by a force fit.

With specific reference to FIG. 3, cloth 94, which has been pretensioned on ring 98 to a first level of tension, is mounted to frame 96 at the desired predetermined level of tension which is preferably greater than its pretensioned level by force fitting ring 98 at its vertical segment over frame 96 at lip 106 thereof. This force fit causes ring 98 to Stretch a sufficient amount to stretch cloth 94 to further tension the cloth 94, which had previously been bonded to ring 98 at a first level of tension, to the desired predetermined level of tension. This predetermined tension level for the cloth 94 is maintained by the fixing of ring 98 in this stretched position due to its force fit on frame 96. Since cloth 94 is fixedly bonded to ring 98, the cloth 94 preferably is not sandwiched between lip 106 and the horizontal segment of ring 98, the cooperation of this bonding and the force fit of ring 98 being sufficient alone to maintain this predetermined level of tension for cloth 94. However, if desired, additional means for maintaining this predetermined level of tension for cloth 94 may be provided by force fitting ring 98 over frame 96 a sufficient amount so as to sandwich bonded cloth 94 between the horizontal segment of ring 94 and the lip 106 of frame 96.

As shown and preferred in FIG. 3, after being force fit over frame 96, ring 98 is preferably crimped at the lower extent of its vertical segment to insure that ring 98 will not jar loose during vibration of the vibratory separator screen. Such crimping is not essential to this invention, however. For example, if the force fit is sufficiently tight, there need not be crimping. Also, instead of crimping, if desired, the lower extent of the vertical segment of ring 98 may be banded about frame 96.

It should be noted that the vibratory separator screen of the present invention may be used as part of a sewage treatment process. More specifically, during vibration of the screen, the sewage sludge may be separated form the water content thereof.

Numerous other embodiments for vibratory separator screens wherein means are provided for providing a desired level of tension for the screen as well as to assist in maintaining this level throughout the life of the screen, as well as various methods and apparatus for making such vibratory separator screens are described in my copending U.S. patent application, Ser. No. 241,142, filed Apr. 5, 1972, now U. S. Pat. No. 3,792,774which application is specifically incorporated by reference herein in its entirety.

It is to be understood that the above described embodiments of the invention are merely illustrative of the principles thereof and that numerous modifications and embodiments of the invention may be derived within the spirit and scope thereof.

What is claimed:

1. A vibratory separator screen comprising an annular frame including a peripheral side wall having an upper extent and a lower extent with an annular lip extending radially outward from said upper extent; a mounting ring having an aperture therein, said ring having a substantially right-angled cross section defined by intersecting horizontal and vertical segments, the inner diameter of said vertical segment being normally less than the outer diameter of said annular lip a cloth of desired mesh secured to the mounting ring and spanning said aperture therein and means for fixedly bonding a segment of said cloth to said mounting ring about substantially the entire periphery of said cloth for securing said cloth thereto at a first multidirectional substantially uniform level of tension across said cloth less than a predetermined multidirectional substantially uniform level of tension, the mounting ring being force fit at its vertical segment onto said frame over said annular lip to increase the level of tension of said cloth and hold said cloth taut about substantially said entire periphery to provide said predetermined level of tension for said cloth and to maintain the cloth at said predetermined level of tension.

2. The screen of claim 1 wherein said force fit mounting ring and said bonding means cooperate to maintain the cloth at said predetermined level of tension.

3. The screen of claim 1 wherein said annular lip at the upper extent of the frame side wall comprises an outwardly extending annular flange, the vertical segment of the mounting ring being crimped at its lower extent beneath said annular flange.

4. The screen of claim 1 wherein said annular lip at the upper extent of the frame side wall comprises an outwardly extending annular flange, the cloth being secured to the vertical segment of the mounting ring and being sandwiched between said vertical segment of said force fit mounting ring and flange to maintain the cloth at said predetermined level of tension.

* * * * *